United States Patent [19]

Kawata

[11] Patent Number: 5,763,125
[45] Date of Patent: Jun. 9, 1998

[54] ELECTROPHOTOGRAPHIC PHOTORECEPTOR AND BASE BODY THEREOF

[75] Inventor: Noriaki Kawata, Kawasaki, Japan

[73] Assignee: Fuji Electric Co., Ltd., Kanagawa, Japan

[21] Appl. No.: 605,636

[22] Filed: Feb. 22, 1996

[30] Foreign Application Priority Data

Feb. 22, 1995 [JP] Japan .................................. 7-033306

[51] Int. Cl.$^6$ ................................................ G03G 15/02
[52] U.S. Cl. ................................................ 430/58; 430/69
[58] Field of Search ............................................ 430/58, 69

[56] References Cited

U.S. PATENT DOCUMENTS

| | | | |
|---|---|---|---|
| 4,952,293 | 8/1990 | Sypula et al. | 204/180.7 |
| 5,512,399 | 4/1996 | Kawata et al. | 430/69 |

FOREIGN PATENT DOCUMENTS 63 188153  8/1988  Japan .
1 102577   4/1989  Japan .

*Primary Examiner*—Mark Chapman
*Attorney, Agent, or Firm*—Spencer & Frank

[57] ABSTRACT

A base body and an electrophotographic photoreceptor including the base body for an electrophotographic photoreceptor includes a cylindrical substrate made of a fiber-reinforced plastic composed of a fiber material selected from the group consisting of glass fiber and carbon fiber, a thermosetting resin which sets by an additional reaction and which is selected from the group consisting of an unsaturated polyester resin and an epoxy resin, conductive fine powder, and inorganic filler selected from the group consisting of calcium carbonate and clay; and a conductive resin layer which is composed of a thermosetting resin which sets by an additional reaction and which is selected from the group consisting of an unsaturated polyester resin and an epoxy resin, and conductive fine powder, and which conductive resin layer is applied onto a peripheral surface of the cylindrical substrate by dip-coating; and a photosensitive layer which is comprised of a charge transport material and a charge generation material, and which is applied onto a peripheral surface of the base body.

18 Claims, 1 Drawing Sheet

ELECTROPHOTOGRAPHIC PHOTORECEPTOR AND BASE BODY THEREOF

BACKGROUND OF THE INVENTION

1. Field of the Invention

The present invention relates to a base body for an electrophotographic photoreceptor to be used as an image-forming member in an electrophotographic device such as a printer and a copying machine and to an electrophotographic photoreceptor comprising such base body. The present invention also relates to a method for manufacturing the base body.

2. Description of the Prior Art

Heretofore, electrophotographic photoreceptors have been prepared in general by using cylinder-shaped base bodies made of aluminum alloy. The base body must be formed by cutting a cylindrical material of aluminum alloy to a predetermined length with a high dimensional accuracy. In addition, a peripheral surface of the base body must be finished in the predetermined ranges of surface-roughness and smoothness thereof. As the base body is based on aluminum, furthermore, there is a problem that a peripheral surface of the body tends to be oxidized and deteriorated by being subjected in moisture and oxygen in an atmosphere. Therefore the base body must be treated with anodized aluminum or with chemicals for preventing the change of its properties but this kind of chemical treatment results in another problem of rising the manufacturing cost.

To solve the above problems, for example, Japanese Patent Application Publication No. 17026/1990 has been proposed a method for manufacturing a photoreceptor's base body by means of an injection molding in which a material based on a polyphenylene sulfide (PPS) resin is used.

In recent years, however, an electrophotographic photoreceptor with a comparatively small diameter has been in great demand for miniaturizing the electrophotographic device, improving a printing speed thereof, and so on. Thus a rotational speed of the photoreceptor must be increased up to the level enough to perform a printing or a copy at the same speed as that of the conventional one and it results in a frequent use of the photoreceptor. Therefore the photoreceptor should be prepared so as to response to light at a high speed with an excellent durability enough to stand the frequent use.

Consequently, a person having ordinary skill in the art requires a base body having a diameter of several hundred micrometers and a thickness of several hundred micrometers to several millimeters. However, it is hard for the injection molding technique to meet such demand because of the technical and economical reasons.

SUMMARY OF THE INVENTION

It is a general object of the present invention to provide a base body to be used in an electrophotographic photoreceptor and a method for manufacturing the same with cost effectively and with easy processing, comparing with the conventional one. The base body is formed as a thin-walled one having a large diameter and a long length with a high dimensional accuracy. Furthermore, the base body shows excellent properties of lightness in weight, less surface deterioration in atmospheric air, high mechanical strength, appropriate surface-roughness, resistance to distortion at high temperatures, resistance to organic solvent, high conductivity, and so on, which are substantially stable in time.

It is another object of the present invention to provide an electrophotographic photoreceptor comprising the above novel base body and a photosensitive layer being layered on a surface of the base body.

It is a further object of the present invention to provide a method for manufacturing the novel base body.

BRIEF DESCRIPTION OF THE DRAWINGS

FIG. 2B shows a cross section along a line X—X in FIG. 2A.

DETAILED DESCRIPTION OF PREFERRED EMBODIMENTS

Figure 1:
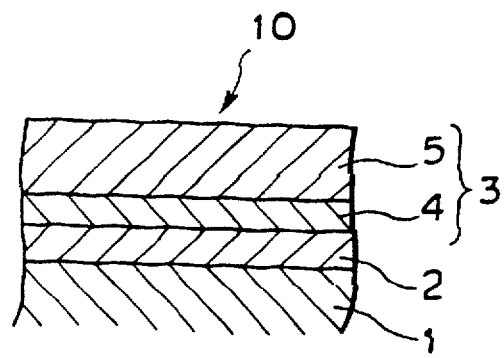
FIG. 1 is a cross sectional plain view of an electrophotographic photoreceptor in accordance with the present invention.

In accordance with the present invention, as shown in FIG. 1, an electrophotographic photoreceptor 10 comprises a base body 1 on which an under-coat layer 2 and a photosensitive layer 3 are layered in that order. As shown in the figure, the photoreceptor 10 is in the type of having functionally distinguishable portions (i.e., a charge-generation layer 4 comprising a charge-generation substance and a charge-transport layer 5 comprising a charge-transport substance) in the photosensitive layer 3. However the present invention is not only limited to that type but also it can be adapted to the type of having comprising both substances in a single layered structure. Furthermore the under-coat layer 2 may be optionally applied on the base body 1 when it is required, thus it is not always necessary.

Figures 2A, 2B:
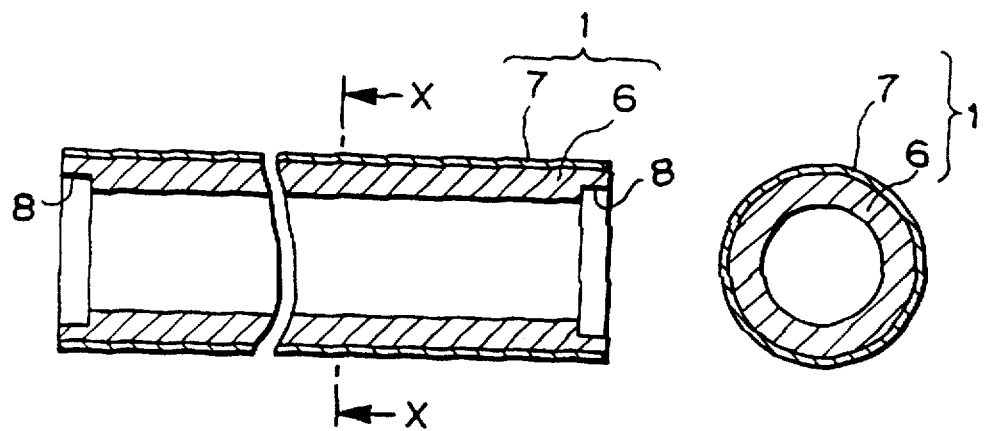
FIGS. 2A and 2B are cross sectional plain views of a photoreceptor's base body in accordance with the present invention, in which FIG. 2 A shows a longitudinal cross section

As shown in FIGS. 2A and 2B, the base body 1 of the electrophotographic photoreceptor 10 according to the present invention comprises a substrate 6 in the form of a cylinder and a cover film 7 made of a thermosetting resin comprising conductive fine powder. The cover film 7 is applied on a peripheral surface of the substrate 6.

The cylindrical substrate 6 is made of a fiber-reinforced plastic (FRP). The FRP mainly consists of glass fiber or carbon fiber, an addition-reaction type thermosetting resin, and conductive fine particle. In the FRP, the thermosetting resin comprising the conductive fine particle is being dispersed throughout a mass of fibers. The cylindrical substrate 6 has an external diameter of 20 mm to 100 mm and a radial thickness of 0.5 mm to 5 mm. In addition, a thickness of the cover film 7 ranges between 40 µm and 100 µm, preferably between 50 µm and 70 µm.

The cylindrical substrate 6 based on the FRP may be manufactured by using a filament-winding (FW) method or a continuous-pultrusion method, both are well-known in the art and described in for example Japanese technical book entitled "Plastic Kako Gijutsu Binran", pages 275–281 and 416–420, 1988, published by Nikkan Kogyo Shinbunsha. They have advantages over other conventional methods in that they easily form a cylindrical substrate having a high conductivity, whether the substrate is forced to include a highly-viscous resin as a result of incorporating a large amount of carbon black described below.

The amount of the fiber material in the FRP ranges between 40 and 80 parts by weight, preferably between 50 and 70 parts by weight. If the fiber material is rich in the FRP, the substrate 6 shows a high strength and high elasticity but a low thermal expansion coefficient. Thus a thin-walled cylindrical base body or a long-sized cylindrical base body with a large diameter can be manufactured by using the fiber-rich FRP.

For the above thermosetting resin, an unsaturated polyester resin or an epoxy resin may be preferably used but not limited to.

If the carbon fiber is used as a fiber material of the conductive FRP, an electric resistance of the substrate 6 is further decreased while at the same time both strength and elastic coefficient thereof are increased. Consequently it results in a high restoring force of the substrate 6 enough to improve the condition of being distorted.

In the base body of the present invention, furthermore, carbon black or metal powder is preferably used as conductive fine powder. The amount of the conductive fine powder corresponds to a volume resistivity of the conductive FRP, i.e., $10^4$ $\Omega$·cm or less, preferably in the range of $10^1$ $\Omega$·cm to $10^2$ $\Omega$·cm. If the carbon black is used as the conductive fine powder, for example, the content thereof ranges between 15 and 25 parts by weight. By adding the conductive fine powder in the thermosetting resin, an uniform electrical resistance can be observed in the radial and axial directions of the cylindrical substrate by an effect of the thermosetting resin which is being distributed throughout the glass fiber or the carbon fiber.

Furthermore, it is desirable to include a calcium carbonate or a clay as an inorganic filler in the conductive FRP. For the clay, typically for example, kaolinite (kaolin clay) of $Al_2O_3 \cdot 2SiO_2 \cdot 2H_2O$, in which water of crystallization is substantially dried by subjecting to heat in an oven, can be preferably used. By adding such inorganic filler in the conductive FRP, therefore, an uniform conductivity and an improved mechanical strength of the cylindrical base body 1, and a cost-cutting can be attained.

In the base body of the present invention, a peripheral surface of the cylindrical substrate 6 made of the conductive FRP is ground and then coated with a conductive fine powder contained thermosetting resin as a coat layer 7. The conductive resin may be the same as the thermosetting resin in the conductive FRP. A thickness of the coated film ranges between 40 μm and 100 μm.

An example of the method for manufacturing a base body to be used in an electrophotographic photoreceptor of the present invention will be described below.

The base body is manufactured by the process including the steps of: cutting the cylindrical substrate of the above conductive FRP to a predetermined length; grinding a peripheral surface of the substrate to a predetermined dimensional accuracy and to a predetermined surface-roughness; and coating the above conductive resin on the finished surface of the cylindrical substrate. Prior to the above process, by the way, the cylindrical substrate can be easily prepared by one of the well-known methods, such as the filament-winding (FW) method and the continuous pultrusion method, mentioned above.

The FW method comprises the steps of: drafting roving of glass fiber (typically 10 to 12 μm diameter) from a reel; removing atmospheric moisture therefrom by passing the roving through a preheat device; winding the roving around a mandrel after impregnating the roving with a solution of the above binder resin; hardening the resin in the roving by introducing the mandrel into a curing oven; and removing the mandrel from the hardened roving to obtain a cylindrical formed product.

On the other hand, the continuous pultrusion method comprises the steps of: impregnating roving of glass fiber with a solution of the above binder resin; introducing the roving into a die; and drafting the roving from the die, in which the roving is hardened before or immediately after pulling it out of the die. Prior to the continuous pultrusion method, alternatively, a bundle of glass fibers of 10 to 12 μm in diameter and approximately 50 μm in length is hardened to a mat form by using silane, borane, glass-greige goods, or the like and then the glass-fiber mat is impregnated with a solution of the conductive fine powder contained thermosetting resin to obtain a cylindrical substrate made of the conductive FRP by the above continuous pultrusion method.

An external diameter of the intact cylindrical substrate obtained by the above FW method or the above continuous pultrusion method is out of an appropriate dimensional accuracy. Therefore, a surface of the cylindrical substrate is subjected to a grinding and then coated with a thin layer of the conductive resin to obtain a base body having a smooth surface with a high dimensional accuracy of its external diameter. This kind of the base body has an appropriate surface roughness of $R_{max}$ 0.2 to 1.5 μm and an appropriate electrical resistance.

Accordingly, an electrophotographic photoreceptor having excellent properties can be produced by forming a photosensitive layer on a surface of the base body obtained by one of the above methods at relatively low cost.

We are now describing concrete examples of the present invention as follows.

EXAMPLE 1

A photoreceptor's base body was prepared by the following process.

At first, a cylindrical substrate (about 30 mm in external diameter and about 0.5 mm in radial thickness) was manufactured by the above FW method from:

(1) 55 parts by weight of glass fiber roving (RER 231, Nippon Ita Glass Co., Ltd.);

(2) 20 parts by weight of an unsaturated polyester resin (TE120, Dai Nippon Ink Chemicals, co., Ltd.);

(3) 15 parts by weight of carbon black (Furnace Carbon BP-480, Cabot Co., Ltd.); and (4) 10 parts by weight of clay (SATINTONE 5, Tsuchiya kaolin Co., Ltd.).

By the way, compounding ratio of the present example will be compared with that of the other examples and comparative examples in Table 1 below.

The above cylindrical substrate was cut to 300 mm length and then a peripheral surface thereof was ground with the conventional grinding means to approximately 30 mm. In addition, both ends of the cylindrical substrate is further processed to form lowered portions (reference numeral 8 in FIG. 2A) on an inner peripheral surface thereof, respectively. Furthermore, a coating solution of conductive resin was applied on the outer peripheral surface of the cylindrical substrate to form a layer of 50 μm in thickness by means of dip-coating, resulting that a base body of an electorophotographic photoreceptor was obtained. In this example, the coating solution of the conductive resin was prepared by dispersing and dissolving 50 parts by weight of an unsaturated polyester, 15 parts by weight of carbon black, and 35 parts of clay in a mixture of ethyl acetate and acetone (1:1).

Physical properties of the base body, such as a volume resistivity, a surface roughness, a roundness, and a dimensional accuracy of external diameter, were measured by the conventional methods according to Japanese Industrial Standard (JIS). Also, a dimensional change of the base body was measured after subjecting in a thermal condition of 120° C. for 48 hours as a thermal test, or after dipping in a solution of methylene chloride for 2 hours as a test of resistance to an organic solvent. The results were listed in Table 2.

Furthermore, a formability of each sample was determined by means of a visual examination.

The results of the decision were represented as follows:

"good" if the sample has a lustrous surface without any marks;

"almost good" if the sample has a less lustrous surface without any marks;

"no good" if the sample has a lusterless surface with marks; and

"worse" if the sample was difficult to release from the die.

EXAMPLE 2

A photoreceptor's base body was prepared by the following process.

At first, a cylindrical substrate (about 30 mm in external diameter and about 0.5 mm in radial thickness) was manufactured by the above pultrusion method from the following materials:

(1) 55 parts by weight of a continuous glass fiber mat (REM 360-G5, Nippon Ita Glass Co., Ltd.);

(2) 20 parts by weight of an unsaturated polyester resin (TE120, Dai Nippon Ink Chemicals, Co., Ltd.);

(3) 15 parts by weight of carbon black (Furnace Carbon BP-480, Cabot Co., Ltd.); and (4) 10 parts by weight of clay (SATINTONE 5, Tsuchiya kaolin Co., Ltd.).

Then the above cylindrical substrate was cut to 300 mm length and a peripheral surface thereof was ground with the conventional grinding means to about 30 mm. In addition, both ends of the cylindrical substrate is further processed to form lowered portions on an inner peripheral surface thereof, respectively. Furthermore, a coating solution of conductive resin was applied on the outer peripheral surface of the cylindrical substrate to form a layer of 50 μm in thickness by means of dip-coating, resulting that a base body of an electorophotographic photoreceptor was obtained. In this example, the coating solution of the conductive resin was prepared by the same way and the same composition as that of Example 1. In addition, physical properties of the base body were measured as the same way as that of Example 1 and results were listed in Table 2.

EXAMPLE 3

A base body of electrophotographic photoreceptor was prepared by the same way as that of Example 1 except of the following composition:

(1) 50 parts by weight of glass fiber roving (RER 231, Nippon Ita Glass Co., Ltd.);

(2) 15 parts by weight of an unsaturated polyester resin (TE120, Dai Nippon Ink Chemicals, Co., Ltd.);

(3) 25 parts by weight of carbon black (Furnace Carbon BP-480, Cabot Co., Ltd.); and (4) 10 parts by weight of clay (SATINTONE 5, Tsuchiya kaolin Co., Ltd.).

Physical properties of the base body were measured as the same way as that of Example 1 and results were listed in Table 2.

EXAMPLE 4

A base body of electrophotographic photoreceptor was prepared by the same way as that of Example 1 except of the following composition:

(1) 40 parts by weight of glass fiber roving (RER 231, Nippon Ita Glass Co., Ltd.);

(2) 30 parts by weight of an unsaturated polyester resin (TE120, Dai Nippon Ink Chemicals, Co., Ltd.);

(3) 15 parts by weight of carbon black (Furnace Carbon BP-480, Cabot Co., Ltd.); and (4) 15 parts by weight of clay (SATINTONE 5, Tsuchiya kaolin Co., Ltd.).

Physical properties of the base body were measured as the same way as that of Example 1 and results were listed in Table 2.

EXAMPLE 5

A base body of electrophotographic photoreceptor was prepared by the same way as that of Example 1 except of without comprising clay and of the following composition:

(1) 80 parts by weight of glass fiber roving (RER 231, Nippon Ita Glass Co., Ltd.);

(2) 10 parts by weight of an unsaturated polyester resin (Epi-coat 828, Shell petroleum Co., Ltd.); and (3) 10 parts by weight of carbon black (Furnace Carbon BP-480, Cabot Co., Ltd.).

Physical properties of the base body were measured as the same way as that of Example 1 and results were listed in Table 2.

EXAMPLE 6

A base body of electrophotographic photoreceptor was prepared by the same way as that of Example 1 except of using an epoxy resin instead of the unsaturated polyester and of the following composition:

(1) 55 parts by weight of glass fiber roving (RER 231, Nippon Ita Glass Co., Ltd.);

(2) 20 parts by weight of an unsaturated epoxy resin (TE120, Dai Nippon Ink Chemicals, Co., Ltd.);

(3) 15 parts by weight of carbon black (Furnace Carbon BP-480, Cabot Co., Ltd.); and (4) 10 parts by weight of clay (SATINTONE 5, Tsuchiya kaolin Co., Ltd.).

Physical properties of the base body were measured as the same way as that of Example 1 and results were listed in Table 2.

Comparative Example 1

A base body of electrophotographic photoreceptor was prepared by the same way as that of Example 1 except of the following composition:

(1) 35 parts by weight of glass fiber roving (RER 231, Nippon Ita Glass Co., Ltd.);

(2) 30 parts by weight of an unsaturated polyester resin (TE120, Dai Nippon Ink Chemicals, Co., Ltd.);

(3) 15 parts by weight of carbon black (Furnace Carbon BP-480, Cabot Co., Ltd.); and (4) 20 parts by weight of clay (SATINTONE 5, Tsuchiya kaolin Co., Ltd.).

Physical properties of the base body were measured as the same way as that of Example 1 and results were listed in Table 2.

Comparative Example 2

A base body of electrophotographic photoreceptor was prepared by the same way as that of Example 1 except of without including clay and of the following composition:

(1) 85 parts by weight of glass fiber roving (RER 231, Nippon Ita Glass Co., Ltd.);

(2) 10 parts by weight of an unsaturated polyester resin (TE120, Dai Nippon Ink Chemicals, Co., Ltd.); and (3) 5 parts by weight of carbon black (Furnace Carbon BP-480, Cabot Co., Ltd.).

Physical properties of the base body were measured as the same way as that of Example 1 and results were listed in Table 2.

Comparative Example 3

A conductive PPS (polyphenylene sulfide) resin (the resin containing a conductive member) molding material commercially available from Toray Co., Ltd., as the trade name of TORELINA A533X01 was used for manufacturing a base body of an electrophotographic photoreceptor. The resin was subjected to the process of injection molding to form the base of 30 mm in external diameter, 0.75 mm in radial thickness, and 300 mm in length.

Physical properties of the base body thus obtained were investigated as the same way as that of the Example 1. The results were listed in Table 2.

Comparative Example 4

A base body of electrophotographic photoreceptor was prepared by the same way as that of Comparative example 3 except that a conductive PBT (Polybutylene telephthalate) resin (the resin containing a conductive member) molding material commercially available from Dai Nippon Ink Chemicals Co., Ltd., as the trade name of EPC-3506, in stead of the conductive PPS.

Physical properties of the base body thus obtained were investigated as the same way as that of the Example 1. The results were listed in Table 2.

TABLE 1

| | Compound ratio (parts by weight) | | | | | | | |
|---|---|---|---|---|---|---|---|---|
| | Examples | | | | | | Comparative Examples | |
| Materials | 1 | 2 | 3 | 4 | 5 | 6 | 1 | 2 |
| Glass fiber roving | 50 | — | 50 | 40 | 80 | 55 | 35 | 85 |
| Continuous glass mat | — | 55 | — | — | — | — | — | — |
| Unsaturated polyester resin | 20 | 20 | 15 | 30 | 10 | — | 30 | 10 |
| Epoxy resin | — | — | — | — | — | 20 | — | — |
| Carbon black | 15 | 15 | 25 | 15 | 10 | 25 | 15 | 5 |
| Clay | 10 | 10 | 10 | 10 | 15 | 0 | 20 | 0 |

TABLE 2

| Properties of base body | Examples | | | | | |
|---|---|---|---|---|---|---|
| | 1 | 2 | 3 | 4 | 5 | 6 |
| formability | Good | Good | Good | Good | Good | Good |
| volume resistivity (Ω · cm) | $2 \times 10^2$ | $3 \times 10^2$ | $5 \times 10$ | $2 \times 10^2$ | $2 \times 10^2$ | $2 \times 10^2$ |
| surface roughness Rmax (μm) | 0.5 | 0.5 | 0.5 | 0.5 | 1.0 | 0.5 |

TABLE 2-continued

| Properties of base body | Examples | | | | | |
|---|---|---|---|---|---|---|
| | 1 | 2 | 3 | 4 | 5 | 6 |
| roundness (μm) | 50 | 50 | 50 | 55 | 40 | 50 |
| dimensional accuracy (±mm) | 0.04 | 0.04 | 0.04 | 0.05 | 0.03 | 0.004 |
| changes in dimension (%) (resistibility to organic solvent) | 0 | 0 | 0 | −0.05 | 0 | 0 |
| changes in dimension (%) (resistability to distortion at high temperatures) | 0 | 0 | 0 | +0.1 | 0 | 0 |

EXAMPLES 7 TO 12

The photoreceptors of Examples 7 to 12 were manufactured by the following method using the base bodies of Examples 1 to 6, respectively.

A surface of the base body was degreased and cleaned. Then an under-coat layer, a charge generation layer, and a charge transport layer were applied on the base body in that order to make a photoreceptor. By means of dip-coating, at first, a first coating solution was applied on a peripheral surface of the base body to form the under-coat layer with a predetermined thickness thereon. Prior to the dip-coating, the above first coating solution was prepared by dispersing 5 parts by weight of alcohol-soluble nylon known by the trade name "CM8000" (Toray Industries Co., Ltd.) into 95 parts by weight of methanol. Then the first coating solution applied on the base body was dried at 120° C. for 15 minutes to form the layer of 0.5 μm in thickness.

After the step of forming the under-coat layer, by means of dip-coating, a second coating solution was applied on a surface of the under-coat layer on the base body to form a charge-generation layer of 0.5 μm in thickness. In this case, the second coating solution of the charge-generation layer was prepared by dispersing 10 parts by weight of X-type non-metallic phthalocyanine known as the trade name FASTGEN BLUE 8120 (Dai Nippon Ink Chemicals, Co., Ltd.), 10 parts by weight of vinyl chloride resin known as the trade name of MR-110 (Nippon Zeon Co., Ltd.) were blended with 686 parts by weight of dichloromethane and 294 parts by weight of 1,2-dichloroethane for 1 hour by a mixer. Then the applied solution was heated at 80° C. for 30 minutes.

Furthermore, the charge transport layer was formed on the charge generation layer of the base body by means of dip-coating using a third coating solution that consists of: 100 parts by weight of hydrazone compound (Fuji Electric Co., Ltd.); 100 parts by weight of polycarbonate resin (Mitsubishi Gas Chemicals, Co., Ltd. Iupilon PCZ); and 800 parts by weight of dichloromethane. After performing the dip-coating, the third solution applied on the charge-generation layer was heated at 90° C. for 1 hour to form the layer of 20 μm in thickness. In this case, the above hydrazone compound can be indicated by the following formula (I).

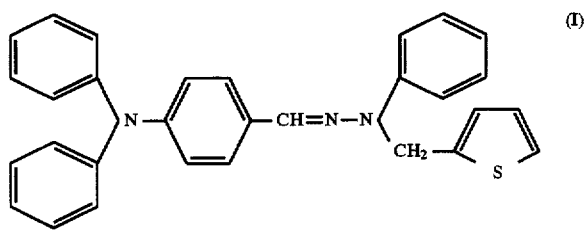

(I)

Electrophotographic properties of each photoreceptor was evaluated by using a photoreceptor-process testing machine (Cynthia 30HL, GENTEC Co., Ltd.). The photoreceptor was installed on the testing machine and rotated at the velocity of 60 mm/second. During the rotation, a surface of the photoreceptor was charged by a corotron system in darkness. In this case, a discharge voltage was regulated so as to charge the photoreceptor's surface at a charged potential Vo of −600V. Then the potential retention rate $V_{k5}$ (%) was estimated by measuring a potential after leaving the photoreceptor in darkness for 5 minutes. Then the photoreceptor was illuminated by light having the wavelength of 780 nm and a luminous flux density of 10 μJ/cm². A residual potential Vr was measured after the irradiation.

For performing the printing test, the photoreceptor was installed in a commercially available laser beam printer. In this case, the print quality of each copy was estimated by observing an image (i.e., letters) transferred on paper. The results were listed in Table 3.

The results of the decision were represented as follows:

"good" if the printer prints sharp letters on paper without exception;

"no good" if the printer prints indistinct letters on paper; and

"worse" if the printer prints indistinguishable letters on paper.

Comparative examples 5, 6, 7, and 8

Electrophotographic photoreceptors of Comparative examples 5, 6, 7, an 8 were prepared by using the base body of Comparative examples 1, 2, 3, and 4, respectively. The method for manufacturing the photoreceptor was the same as that of Example 7. The obtained photoreceptors were subjected to the test described in Example 7 and the results were listed in Table 3.

As shown in Tables 2 and 3, the base bodies of Examples 1 to 6 shows not only good formabilities but also excellent physical properties. On the other hand, the base body of Comparative example 1 also shows good formability because of comprising a small amount of glass fiber (i.e., 35 parts by weight thereof), but its physical properties of resistance to organic solvent, resistance to distortion at high temperatures, dimensional accuracy, roundness, and formability are inferior to that of Examples 1 to 6. Consequently, a preferable content of the glass fiber in the base body ranges between 40 and 80 parts by weight, more preferably between 50 and 70 parts by weight.

Furthermore, a formability of the base body of Comparative example 2 is inferior to that of Examples 1 to 4. In Comparative example 2, a large residual potential Vr is observed as a result of a low amount of carbon black in the base body.

The base body of Comparative example 3, which is prepared by using PPS, shows a good formability but its physical properties of resistance to organic solvent and resistance to distortion at high temperatures are inferior to that of Examples 1 to 6.

The base body of Comparative 4, which is prepared by using PBT, does not show a good formability and its physical properties of dimensional accuracy, surface-roughness, resistance to organic solvent, and resistance to distortion at high temperatures are inferior to that of Examples 1 to 6.

Regarding as a whole, the base bodies and the photoreceptors of Examples 1 to 6 and 7 to 12 are superior to that of Comparative examples. Therefore, the high print qualities can be obtained by using the photoreceptors of Examples 7 to 12 but not of Comparative examples. By using FRP of the present invention as a material of the base body, in particular, the properties of roundness, resistance to organic solvent, and resistance to distortion at high temperatures can be improved.

TABLE 3

| Examples | Properties of photoreceptor | | |
|---|---|---|---|
| | Vk5 (%) | Vr (V) | Print |
| 7 | 92 | 30 | Good |
| 8 | 92 | 30 | Good |
| 9 | 95 | 30 | Good |
| 10 | 90 | 25 | Good |
| 11 | 90 | 33 | Good |
| 12 | 90 | 30 | Good |
| Comparative examples | | | |
| 5 | 90 | 35 | No good |
| 6 | 90 | 150 | Worse |
| 7 | 18 | 50 | No good |
| 8 | 70 | 35 | No good |

What is claimed is:

1. A base body for an electrophotographic photoreceptor, comprising:
   a. a cylindrical substrate made of a fiber-reinforced plastic comprised of:
      i. a fiber material selected from the group consisting of glass fiber and carbon fiber,
      i.i. a thermosetting resin which sets by an additional reaction and which is selected from the group consisting of an unsaturated polyester resin and an epoxy resin,
      i.i.i. conductive fine powder and
      i.v. inorganic filler selected from the group consisting of calcium carbonate and clay; and
   b. a conductive resin layer comprised of a thermosetting resin which sets by an additional reaction and which is selected from the group consisting of an unsaturated polyester resin and an epoxy resin, and conductive fine powder, which conductive resin layer is applied onto a peripheral surface of the cylindrical substrate by dip-coating.

2. The base body for an electrophotographic photoreceptor as claimed in claim 1, wherein the conductive fine powder of the cylindrical substrate is selected from the group consisting of carbon black powder and metal powder, and wherein the conductive fine powder of the conductive resin layer is selected from the group consisting of carbon black powder and metal powder.

3. The base body for an electrophotographic photoreceptor as claimed in claim 1, wherein the fiber material is present in an amount ranging between 40 and 80 parts by weight of the fiber-reinforced plastic.

4. The base body for an electrophotographic photoreceptor as claimed in claim 1, wherein the fiber-reinforced plastic has a volume resistivity which is $10^4$ Ω-cm or less.

5. The base body for an electrophotographic photoreceptor as claimed in claim 1, wherein the thermosetting resin of the conductive resin layer is identical to the thermosetting resin of the cylindrical substrate.

6. The base body for an electrophotographic photoreceptor as claimed in claim 1, wherein the conductive resin layer has a surface-roughness $R_{max}$ ranging between 0.2 µm and 1.5 µm.

7. The base body for an electrophotographic photoreceptor as claimed in claim 1, wherein the fiber material is present in an amount ranging between 50 and 70 by weight of the fiber-reinforced plastic.

8. The base body for an electrophotographic photoreceptor as claimed in claim 1, wherein the fiber-reinforced plastic has a volume resistivity ranging from $10^1$ to $10^2$ Ω-cm.

9. An electrophotographic photoreceptor, comprising:

a base body for an electrophotographic photoreceptor, comprising:

a. a cylindrical substrate made of a fiber-reinforced plastic comprised of:
   i. a fiber material selected from the group consisting of glass fiber and carbon fiber,
   i.i. a thermosetting resin which sets by an additional reaction and which is selected from the group consisting of an unsaturated polyester resin and an epoxy resin,
   i.i.i. conductive fine powder, and
   i.v. inorganic filler selected from the group consisting of calcium carbonate and clay; and b. a conductive resin layer which is comprised of a thermosetting resin which sets by an additional reaction and which is selected from the group consisting of an unsaturated polyester resin and an epoxy resin, and conductive fine powder, and which conductive resin layer is applied onto a peripheral surface of the cylindrical substrate by dip-coating; and a photosensitive layer which is comprised of a charge transport material and a charge generation material, and which is applied onto a peripheral surface of the base body.

10. The electrophotographic photoreceptor as claimed in claim 9, further comprising an under-coat layer provided between the conductive resin layer and the photosensitive layer.

11. The electrophotographic photoreceptor as claimed in claim 9, wherein the photosensitive layer consists of a charge transport layer comprising the charge transport material and a charge generation layer comprising the charge generation material.

12. The electrophotographic photoreceptor as claimed in claim 9, wherein the conductive fine powder of the cylindrical substrate is selected from the group consisting of carbon black powder and metal powder, and wherein the conductive fine powder of the conductive resin layer is selected from the group consisting of carbon black powder and metal powder.

13. The electrophotographic photoreceptor as claimed in claim 9, wherein the fiber material is present in an amount ranging between 40 and 80 parts by weight of the fiber-reinforced plastic.

14. The electrophotographic photoreceptor as claimed in claim 9, wherein the fiber-reinforced plastic has a volume resistivity which is $10^4$ Ω-cm or less.

15. The electrophotographic photoreceptor as claimed in claim 9, wherein the thermosetting resin of the conductive resin layer is identical to the thermosetting resin of the cylindrical substrate.

16. The electrophotographic photoreceptor as claimed in claim 9, wherein the conductive resin layer has a surface-roughness $R_{max}$ ranging between 0.2 mm and 1.5 mm.

17. The electrophotographic photoreceptor as claimed in claim 9, wherein the fiber material is present in an amount ranging between 50 and 70 by weight of the fiber-reinforced plastic.

18. The electrophotographic photoreceptor as claimed in claim 9, wherein the fiber-reinforced plastic has a volume resistivity ranging from $10^1$ to $10^2$ Ω-cm.

* * * * *